Feb. 16, 1932.  B. R. WHITE  1,845,948
OUTLET BOX SUSPENSION MEANS
Filed May 28, 1930   2 Sheets Sheet 1
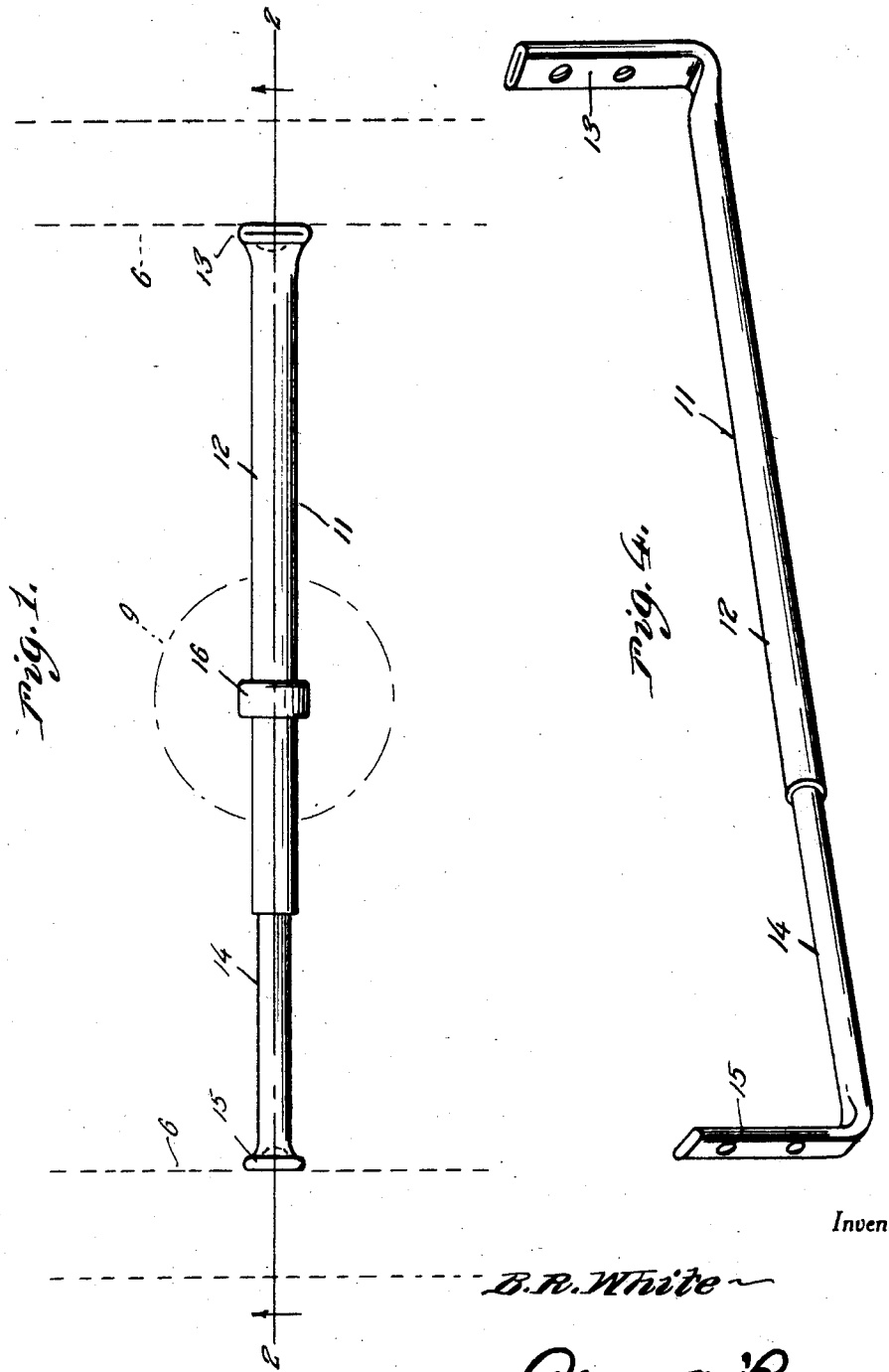
Inventor
B. R. White
By Clarence A. O'Brien
Attorney Feb. 16, 1932. B. R. WHITE 1,845,948
OUTLET BOX SUSPENSION MEANS
Filed May 28, 1930 2 Sheets-Sheet 2
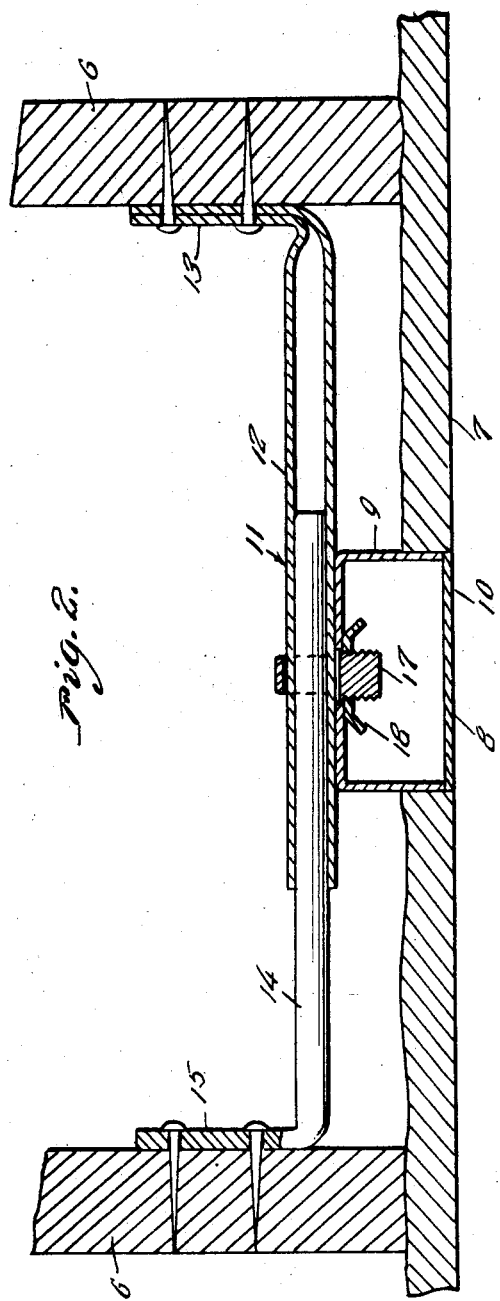
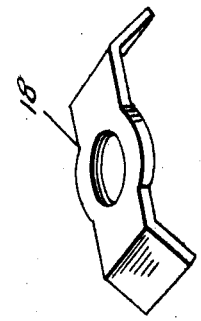
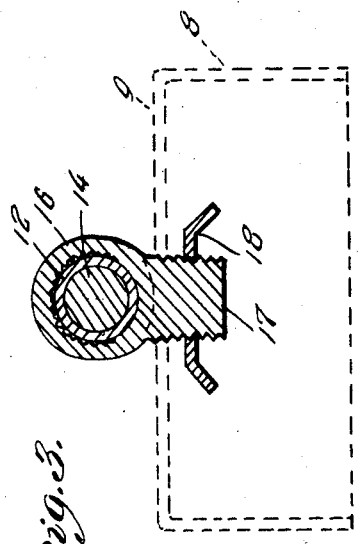
Inventor
B. R. White
By Clarence A. O'Brien
Attorney Patented Feb. 16, 1932

1,845,948

UNITED STATES PATENT OFFICE

BEVELEY RECTOR WHITE, OF SAN ANGELO, TEXAS

OUTLET BOX SUSPENSION MEANS

Application filed May 28, 1930. Serial No. 456,763.

This invention relates to an improved device or means which is especially but not necessarily designed to function as a suspension device for an electrical wire outlet box.

Under the present arrangement, the most common means for attaching a box to joists comprises a wooden strip which is nailed neatly to adjacent joists at the point of attachment of the junction or outlet box.

In some instances, however, especially designed rods have been provided and these are nailed across the bottom edges of the joists. The degree of utility of these makeshift devices is limited indeed.

The purpose of the present invention is to provide an adjustable suspension device in the nature of a longitudinally extensible structure of companion sections adjustable toward and from each other to permit the device to be securely anchored between joists where the space between the joists varies considerably.

Another feature of the invention is embodied in the utilization of a connecting or attaching bracket for fastening the box on the suspension device, this being longitudinally shiftable to permit convenient placement and subsequent maintenance of the box.

In the drawings:—

Figure 1 is a top plan view of the appliance in place.

Fig. 2 is a longitudinal sectional view taken approximately on the plane of the line 2—2 of Fig. 1, showing the box attached in position.

Fig. 3 is an enlarged sectional view taken approximately on a plane passing through the center of Fig. 2.

Fig. 4 is a detail perspective view of the extensible hanger.

Fig. 5 is a perspective view of a retaining nut.

The entire assembly may well be seen in Fig. 2, wherein it will be observed that the complemental joists are distinguished by the numerals 6 and the ceiling indicated by the numeral 7. The numeral 8 is employed to denote generally the outlet box. This comprises a cup-like inverted shell or body portion 9 and a removable cover plate 10. The hanger is generally represented by the numeral 11 and comprises a longitudinally extensible device including a horizontal tube 12 having laterally bent apertured attaching ends 13 which are nailed or otherwise fastened to one joist.

Fitted telescopically in this tube is a companion rod section 14 having laterally bent attaching ends 15, securely nailed in place. These devices are telescopically considered together so as to permit the length of the complete hanger 11 to be adjusted according to conditions.

The box attaching bracket is longitudinally shiftable and comprises a collar 16 which surrounds the tube 12, and which has its inner periphery toothed to facilitate maintenance when placed in adjusted position. This bracket also includes a depending screw threaded stud 17 which accommodates the retaining nut 18. The nut is here shown in the nature of a washer, having downturned end portions to facilitate application and removal.

This means permits the box 8 to be adjustably mounted on the stem 17 and permits the complete unit or bracket to be bodily adjusted with the box along the suspension device 11. The complete assembly, it will be understood, is primarily composed of three major parts namely, the longitudinally extensible hanger 11, made from a length of gas pipe and a suitable rod.

The second part is the attaching bracket, which is bodily adjustable on the suspension device 11 and which serves to accommodate the third part of box 8.

This arrangement, it is obvious, better fulfills the requirement of a structure of this class than the prior art devices mentioned at the outset of the description. In fact, the device is characterized by simplicity, economy and durability and may be made sufficiently small so that conduit connections may be placed in all four knock-outs in the top of the box. This cannot be done with the ordinary wood attaching bar.

The device may be installed more expeditiously in a more dependable and efficient manner, and it covers a greater range of spacings between the joists than other marketed supports, with which I am familiar.

The expanse of the device is sufficient to enable it to have the additional function of providing a support for a ceiling fan.

The present embodiment of the invention has been disclosed in considerable detail merely for the purpose of exemplification since in actual practice it attains the features of advantage enumerated as desirable in the statement of the invention and the above description.

It is to be understood that by describing in detail herein any particular form, structure, or arrangement, it is not intended to limit the invention beyond the terms of the claim or the requirements of the prior art.

Having thus described my invention, what I claim as new is:—

A supporting means for an outlet box comprising a pair of telescopic members circular shaped in cross section, each member having its outer end bent at right angles and perforated to receive fastening means, a collar encircling one member and having teeth on the upper part of its inner circumference, an externally threaded stem depending from the collar and formed therewith and adapted to pass through a hole in an outlet box and a nut member threaded on the stem for holding the box thereon, the teeth on the upper part of the collar penetrating the telescopic member when the nut is tightened to lock the collar on said member.

In testimony whereof I affix my signature.

BEVELEY RECTOR WHITE.